Figure 1:
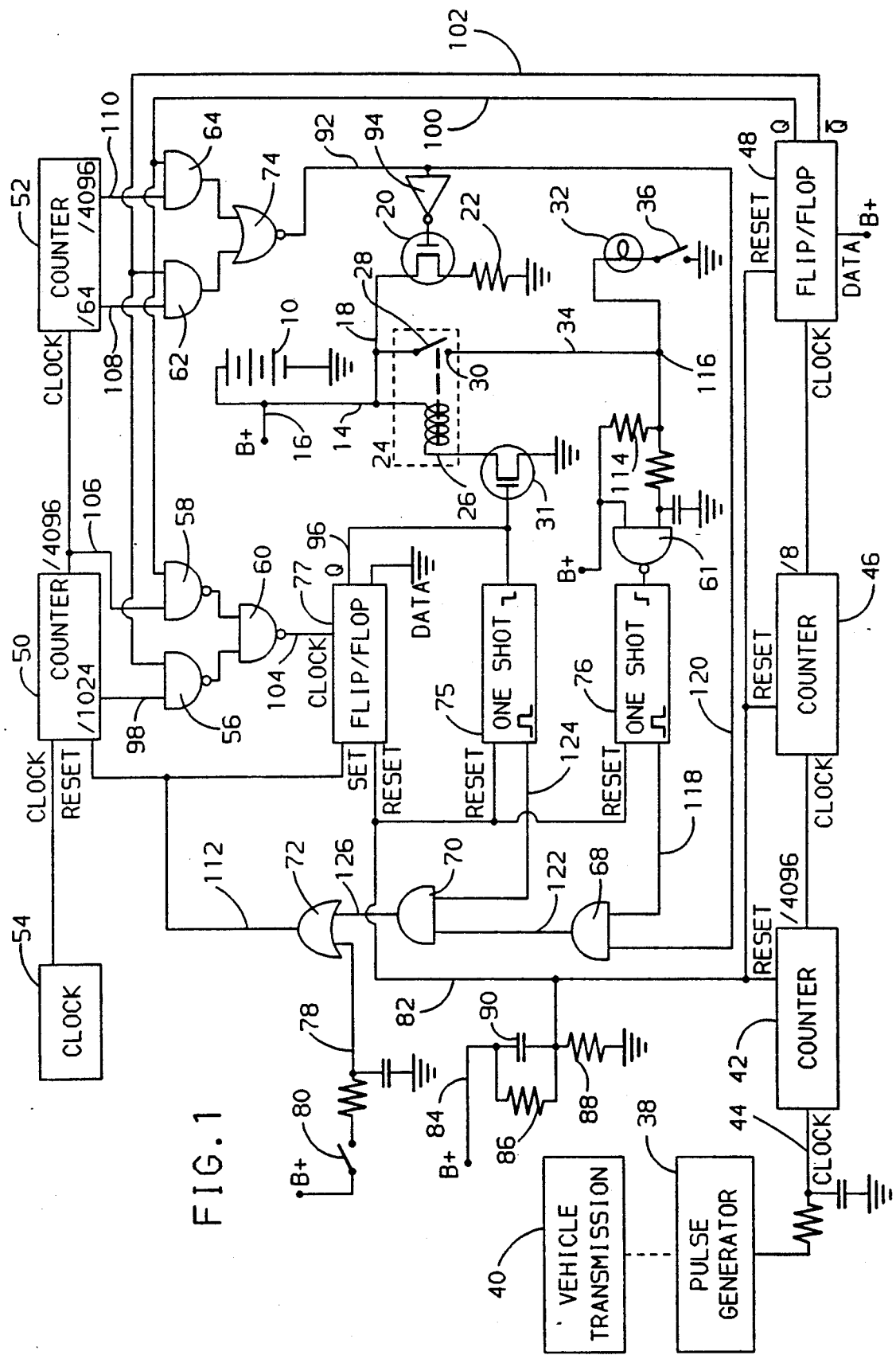

United States Patent [19]

Carpenter

[11] Patent Number: 5,204,992
[45] Date of Patent: Apr. 20, 1993

[54] MOTOR VEHICLE BATTERY DISCHARGE LOAD CURRENT CONTROL

[75] Inventor: James A. Carpenter, Durand, Mich.

[73] Assignee: General Motors Corporation, Detroit, Mich.

[21] Appl. No.: 620,467

[22] Filed: Nov. 30, 1990

[51] Int. Cl.$^5$ ............................................. H02H 7/18
[52] U.S. Cl. ..................... 307/10.7; 377/16; 377/107
[58] Field of Search ............... 307/10.1, 10.6, 10.7, 307/10.8, 38, 39, 113, 115, 141.4, 592, 595, 596, 598, 603; 377/16, 107, 110; 320/38, 13; 340/636

[56] References Cited

U.S. PATENT DOCUMENTS

| | | | |
|---|---|---|---|
| 3,723,752 | 3/1973 | Russell | 307/10.7 |
| 4,218,717 | 8/1980 | Shuster | 361/79 |
| 4,301,390 | 9/1981 | Earle | 315/82 |
| 4,493,001 | 1/1985 | Sheldrake | 361/92 |
| 4,733,100 | 3/1988 | Nusairat et al. | 307/9.1 |
| 4,864,154 | 9/1989 | Copeland et al. | 307/10.7 |
| 4,902,956 | 2/1990 | Sloan | 320/13 |

Primary Examiner—A. D. Pellinen
Assistant Examiner—David Osborn
Attorney, Agent, or Firm—Creighton R. Meland

[57] ABSTRACT

A battery discharge load current control system for a motor vehicle electrical system. The system has a short term timer and a long term timer. The timers are comprised of pulse counters that count constant frequency clock pulses. The short term timer will disconnect certain inadvertent loads from the battery after the elapse of a time period. Inadvertent loads as those that are controlled by a control switch that has not been turned-off by the driver of a vehicle. The long term timer disconnects parasitic loads from the battery after the elapse of a time period. Parasitic loads are those that are normally permanently connected to the battery. The time periods can be varied as a function of the number of miles that the vehicle has been driven and are increased after the vehicle has been driven a predetermined number of miles. The short term timer can be reset to start a new timing cycle if the control switch is closed after the short term timer has disconnected the inadvertent load from the battery.

5 Claims, 1 Drawing Sheet

MOTOR VEHICLE BATTERY DISCHARGE LOAD CURRENT CONTROL

This invention relates to a battery discharge load current control for motor vehicle electrical systems which interrupts, on an elapsed time-basis, the supply of battery current to motor vehicle loads to thereby prevent over-discharge of the battery.

There are two types of electrical loads on a motor vehicle which, if left connected to the vehicle battery when the vehicle engine is not running, can cause the battery to become discharged to a point where it will not start the engine. One type of load is a so-called parasitic load. This type of load is permanently connected to the battery and is continuously energized.

Examples of parasitic loads are the clock portion of the vehicle radio, the vehicle Electronic Control Module (memory keep-alive) and the generator voltage regulator. These parasitic loads draw very little current usually a few milliamps or less. However, if the vehicle is not driven for a number of days, the battery can be over-discharged.

The other type of loads on a motor vehicle are so-called inadvertent electrical loads. These loads are the type that are left energized because the operator of the motor vehicle fails to turn-off a load. Examples of such inadvertent loads are courtesy/reading lights, trunk light, glove compartment light and vanity light. The current drawn by the inadvertent loads is much higher than the parasitic load current. It may be as high as 0.67 amps for reading/courtesy lamps. When an inadvertent load is not turned-off, the battery can be discharged to a no-engine-start condition in a matter of a few hours.

It is an object of this invention to provide a battery discharge load current control system that can disconnect the inadvertent loads and the parasitic loads from the battery after the elapse of predetermined time periods. The time periods for turn-off of the parasitic loads is substantially longer than the time period for turn-off of the inadvertent loads.

Another object of this invention is to provide a system of the type described where the parasitic loads are controlled by a short term timer and where the inadvertent loads are controlled by a long term timer.

Still another object of this invention is to provide a system of the type described where the time periods for shut-off of the inadvertent and parasitic loads is varied as a function of the accumulated mileage that the vehicle has been driven beginning when the vehicle is first driven. More specifically, the system of this invention increases the time periods once the vehicle has attained a predetermined mileage. This mileage is selected such that when it is attained, the vehicle will have been expected to have been delivered to a customer.

A further object of this invention is to provide a system of the type described that has a retrigger feature that allows the operator of the vehicle to reset or retrigger the timer for the inadvertent loads by manual operation of a control switch that controls an inadvertent load. This feature tends to prevent the inconvenience to the customer of a turn-off of an inadvertent load by an inadvertent load timer.

IN THE DRAWINGS

The single figure drawing illustrates a control system made in accordance with this invention.

Referring now to the drawing, reference numeral 10 designates a 12 volt storage battery on a motor vehicle. The negative side of the battery is grounded and its positive side is connected to a conductor 14. Conductor 14 is connected to conductors 16 and 18. Conductor 16 is shown connected to a junction labelled B+. The system shown in the drawing has other junctions labelled B+ and these junctions are all connected to junction B+ on conductor 16 by conductors which have not been illustrated. When the engine of the vehicle is running, the battery 10 is charged by a diode-rectified alternating current that has not been illustrated.

Conductor 18 is connected to a P-channel power field effect transistor 20. When transistor 20 is biased conductive, it connects an electrical load 22 to battery 10 and the load is then energized. The load 22 is, a so-called parasitic load. The term parasitic load means a type of load that, on a conventional motor vehicle electrical system, is continuously powered by the battery; that is, a load that is permanently connected to the battery. Examples of parasitic loads are, the keep-alive memory of a vehicle Electronic Control Module, generator voltage regulator and the clock time and radio presets of the radio. The parasitic loads draw very little current, for example, a total of about 11.5 milliamps. However, even with this small load, the battery can become discharged to point where it will not start the vehicle engine if the vehicle engine is not operated for a number of days, for example, about 23 days during summer temperatures. Although only one parasitic load 22 has been illustrated in the drawing, it is to be understood that a number of parasitic loads can be controlled all of which would be connected in parallel.

The system has a relay 24 that is comprised of coil 26, a movable contact 28 and a fixed contact 30. The relay is a normally open type; that is, contact 26 normally spring biased out of engagement with contact 30. When relay coil 26 is energized, movable contact 28 is moved into engagement with fixed contact 30. Relay coil 26 is connected in series with a N-channel field effect transistor 31 which controls the energization of relay coil 26. When transistor 31 is biased conductive, relay coil 26 is energized to close the contacts of the relay. When transistor 31 is biased nonconductive, relay coil 26 is deenergized and the relay contacts open.

Relay 24 controls the energization of so-called inadvertent electrical loads. These loads are of a type that can be inadvertently left on by the driver of a motor vehicle if the driver fails to turn off a control switch that controls an associated load. These loads have been shown as a lamp 32. One side of lamp 32 is connected to fixed contact 30 by conductor 34. The opposite side of lamp 32 is connected to one side of control switch 36. The opposite side of switch 36 is grounded. Examples of inadvertent loads are courtesy/reading lamps, trunk light, glove compartment light and vanity light. Each of these lamps has its own control switch.

Lamp 32 and switch 36 are representative of one inadvertent load. There will, of course, be a plurality of inadvertent loads and associated switches, all connected in parallel between conductor 34 and ground.

The inadvertent loads draw substantially more current than the parasitic loads. The current drawn by the trunk lamp may be as high as 0.97 amps. The amount of current drawn depends upon the number of lamps that are energized at the same time. If only one inadvertent load is left on, the battery can be discharged to a noengine-start condition in the winter season in 11 hours or less.

The system has apparatus for determining the number of miles that the vehicle has been driven. This apparatus comprises a pulse generator 38 that may be, for example, a magnetic pick-up that is driven by a part of the vehicle transmission 40. The apparatus that has just been described can produce, for example, about 4,004 pulses per mile of travel. The pulses so developed are applied to a 14 stage binary counter 42 through line 44. Counter 42 may be a Type 4020 counter. Counter 42 is connected to another counter 46 which is the same type as counter 42. The output of counter 46 is connected to the clock input of a flip-flop 48 which may be one-half of a Type 4013 flip-flop.

The operation of the mileage accumulator will now be described. When the battery 10 is connected to the system, counters 42 and 46 are reset to a zero count value. Counters 42 and 46 count the pulses on line 44 as the vehicle is driven. Counter 42 develops an output pulse for every 4,096 input pulses. Counter 46 develops an output pulse when it has received eight input pulses. When counter 46 develops an output pulse, it clocks flip-flop 48 to a predetermined logic state. This happens when the vehicle has been driven a certain number of miles. In the example given, flip-flop 48 is triggered after the vehicle has been driven for about 8.18 miles. It will be appreciated that the number of miles to trigger flip-flop 48 could be increased to suit a particular application by arranging counters to count more pulses before flip-flop 48 is triggered.

The system has two additional counters 50 and 52 which can be Type 4020 counters. Counter 50 is connected to a source of clock pulses 54 which may have a pulse rate of 5 Hz. These counters operate as timers and, as will be described in more detail hereinafter, these timers control the disconnection of the parasitic and inadvertent loads from the battery.

The system further includes NAND gates 56, 58 60 and 61; AND gates 62, 64, 68 and 70; an OR gate 72 and a NOR gate 74. The system has two one-shot multivibrators 75 and 76 and another flip-flop 77. The multivibrators 75 and 76 may be Type 4047 multivibrators and flip-flop 77 may be one-half Type 4013 flip-flop.

One input of OR gate 72 is connected to line 78 which, in turn, is connected to one side of a vehicle ignition switch 80. The opposite side of switch 80 is connected to B+or, in other words, is connected to the positive side of battery 10.

A line or conductor 82 is connected to battery line 84 through a network comprised of resistors 86 and 88 and capacitor 90. Battery line or conductor 84 becomes connected to the positive side of battery 10 when the battery is connected to the electrical system of the motor vehicle.

The operation of the system will now be described. When the battery 10 is connected to the system, the voltage on line 82 goes high. This resets counters 42 and 46, flip-flop 48, one-shot multivibrators 75 and 76 and flip-flop 77. This is indicated by "Reset" legends on the drawing.

In this condition of operation, counters 42 and 46 can now start counting the output pulses of pulse generator 38 and the counters can now start to accumulate mileage pulses once the vehicle is driven. Mileag is accumulated beginning with the first time the vehicle is driven.

In the condition of operation that has just been described, relay contacts 28 and 30 are engaged or closed and transistor 20 is biased conductive. Accordingly, the parasitic loads are energized and any inadvertent loads can be energized by closure of its control switch.

In this regard, the gate of transistor 20 is connected to line 92 through inverter 94 and the logic state of the line 92 is now such as to bias transistor 20 conductive. Further, the logic state of line 96 (output of flip-flop 77) is such as to bias transistor 31 conductive thereby energizing relay coil 26 to cause contacts 28 and 30 to close.

Let it be assumed that the vehicle has not, as yet, been driven for the predetermined mileage; that is, it has not been driven for about 8.18 miles. The counter 50 starts counting clock pulses from clock 54 when the battery is connected. When counter 50 has counted 1,024 clock pulses, which corresponds to a time period of about 3.4 minutes, the logic state of line 98 changes. Since the predetermined mileage has not been attained, the logic states of lines 100 and 102 (output of flip-flop 48) are such that in conjunction with gates 56, 58 and 60, a logic state transition is developed on line 104 that causes the output line 96 of flip-flop to assume a voltage level that biases transistor 31 nonconductive thereby causing relay contacts 28 and 30 to open. The inadvertent load circuit is therefore opened at about 3.41 minutes after counter 50 has been reset.

Counter 50 continues to count up. When it counts up to 4,096 pulses, the logic state of line 106 changes. This change in logic state, however, does not change the logic state of line 104. Thus, because the accumulated mileage has not been attained, gate 58 will not permit a change in the logic state of line 104.

When counter 50 attains a count of 4,096, a clock pulse is applied to counter 52. After 64 clock pulses have been counted by counter 52, the logic state of line 108 changes. On the assumption that the predetermined mileage has not been attained, the change in logic state on line 108 causes, via gates 62 and 74, a change in the logic state of line 92 which is such that the transistor 20 is biased nonconductive to thereby deenergize the parasitic loads. This shut-off occurs after a time period corresponding to a count of about 262,144 pulses, which translates into about 14.56 hours or about 0.60 days. Therefore, the parasitic loads 22 are turned off after a time period of about 0.60 days after counter 50 is reset.

Assume now that the predetermined mileage has been attained and that counters 50 and 52 have been reset. When the predetermined mileage is attained, flip-flop 48 is triggered to change the state of lines 100 and 102. This change in state causes the logic to be in a condition where a change in logic state of line 98 will not cause a change in the state of line 96. Consequently, when counter 50 counts 1,024 pulses, relay contacts 28 and 30 remain closed.

The same is true of a change in logic state of line 108. Such a change will not cause a change in state of line 92 and, accordingly, transistor 20 remains biased conductive.

When counter 50 has counted 4,096 pulses, a change of state occurs on line 106 which is now passed by gates 58 and 60 to flip-flop 77 which, in turn, now causes contacts 28 and 30 to open. This is because the predetermined mileage has now been accumulated. The time period for shut-off of the inadvertent loads has now been increased from about 3.41 minutes to about 13.65 minutes.

Counter 50 continues to count up as does counter 52. After about (4.096×4,096) clock pulses are counted, a change in logic state occurs on line 110. This change, via gates 64 and 74, causes a change in state of line 92 which, in turn causes transistor 20 to be biased nonconductive. This shuts off the parasitic loads 22. The time period for shut-off of the parasitic loads has been increased from about 0.60 days to about 38 days.

In summary, it can be seen that before the vehicle has attained a predetermined mileage the time periods for turn-off of the inadvertent and parasitic loads is respectively about 3.41 minutes and 0.60 days. After the predetermined mileage has been attained, these time periods are respectively increased to 13.65 minutes and 38 days.

Each time ignition switch 80 is closed, the voltage on line 78 goes high. This has the effect, via gate 72, of changing the logic state of line 112. This change resets counters 50 and 52 to a zero count and sets flip-flop 77 to a state that causes relay contacts 28 and 30 to close (transistor 31 conductive). Further, transistor 20 is biased conductive. Transistors 31 and 20 remain biased conductive as long as ignition switch 80 is closed and the counters remain reset as long as the ignition switch 80 is closed. The time periods for turning off the inadvertent or parasitic loads start when ignition switch 80 is opened. The time periods also start when the battery is initially connected to the motor vehicle electrical system providing the ignition switch is open.

The system of this invention has an important retrigger feature which will now be described. In regard to this feature, it is pointed out that the system has a pull-up resistor 114 connected between B+ and junction 116. Junction 116 is connected to line 34 which feeds inadvertent load 32. If no inadvertent load 32 is energized; that is, switch 36 is open, the voltage at junction 116 will be high. If relay contacts 28 and 30 are open and switch 36 is then closed, the voltage of junction 116 goes from high to low. This high to low transition triggers one-shot 76 to cause a voltage transition on line 118. The occurrence of this transition together with two other conditions, that must be true, will reset timer or counter 50. These conditions are that counter 52 has not timed-out. If this counter does time-out, all loads (inadvertent and parasitic) are kept off until an ignition cycle is seen (switch 80 is closed). Further, a time-out of counter 52 will cause line 92 and line 120 connected to gate 68 to assume a certain logic state. The other condition is that a time-out opening of relay 24 does not create the high to low transition. This would happen whenever the inadvertent load output (line 34) is turned off by the relay while switch 36 is closed. The one-shot 75 is triggered by a voltage transition on line 96 which biases transistor 31 nonconductive to therefore cause the opening of relay contacts.

To summarize, if counter 52 times-out, line 120 goes low and, consequently, there will be no output transition on the output line 122 of AND gate 68 even if one-shot 76 is triggered by a high to low transition at junction 116. If counter 52 has not timed-out, line 120 is high and now an output from one-shot 76 will cause a transition to be developed on line 122. If there is no output from one-shot 75 on line 124, the AND gate 70 will develop an output on line 126 which through gate 72 will reset counter 50. If the relay 24 opens with switch 36 closed, both one-shots 75 and 76 are triggered simultaneously. The net result of this is that no transition is developed on line 126 and counter 52 is not reset. In this condition of operation, one-shot 75 is triggered by the transition on line 96 and one-shot 76 was triggered by the high to low transition at junction 116.

With the foregoing in mind, it can be seen that with ignition switch 80 open, counter or timer 50 will start timing. When time-out occurs, the inadvertent load 32 is turned off. Assuming that no inadvertent loads were on (switch 36 open) the attempted energization of an inadvertent load (closure of switch 36) will reset timer or counter 50 to start the timing cycle over again. Thus, the operator of the motor vehicle can energize, for example, a reading lamp which has been previously turned off by the time-out of timer or counter 50 by closing a switch like switch 36.

If the time-out of timer or counter 50 occurs while a load is on (switch 36 closed), to reset timer 50, that load must first be turned off (switch 36 opened) and then back on (switch 36 closed). The opening of switch 36 will cause junction 116 to go high and the subsequent closure of switch 36 will cause a high to low voltage transition at junction 116 which triggers one-shot 76 and, via gates 68, 70 and 72, causes a reset of timer or counter 50.

In summary, it will be appreciated that counter 50 is what may be termed a short term timer. Further, it may be termed an inadvertent load control timer since it controls the time periods that the inadvertent loads can be energized before turn-off.

Counter 52 can be called a long term timer since the time periods it develops are much longer than the time periods developed by timer 50. Further, timer 52 can be termed a parasitic load control timer since it controls the time periods that the inadvertent loads cam be energized before turn-off.

The predetermined mileage is determined by how many miles the vehicles is expected to be driven before being delivered to a customer. Prior to delivery, the vehicle is in the automobile assembly plant or may be on a dealer's lot waiting to be sold. The vehicle further may be in transit from the automobile plant to the dealer. Prior to customer delivery, it is desirable to keep the time periods of turn-off of inadvertent and parasitic loads shorter than the time periods that are used after the car is delivered to the customer. This is intended to provide the customer with a battery on the vehicle that has a full state of charge. After the vehicle is delivered to the customer, it is expected that the vehicle will be driven enough to charge the battery to a full state of charge. Accordingly, the time periods for turn-off of the loads is increased at a time when it is expected that the vehicle has been delivered to a customer.

In the foregoing description of this invention, specific time periods for turning-off the inadvertent and parasitic loads have been set forth. These time periods are given by way of example and it is to be understood that these time periods can have magnitudes other than the ones specified. These time periods are determined by selecting counter apparatus that will provide the desired time periods.

A specific accumulated mileage magnitude for triggering flip-flop 48 has been set forth. This magnitude is also given by way of example and may be other than the one specified. The mileage value is determined by selecting counter apparatus that will provide the desired mileage magnitude.

The system of this invention has been disclosed as being by a hard-wired digital system. It will be appreciated that the system could take the form of a programmed microprocessor.

The embodiments of the invention in which an exclusive property or privilege is claimed are defined as follows:

1. A battery discharge load current control system for a motor vehicle electrical system comprising, a battery, an electrical load, a load control switching means, means connecting one side of said switching means to one side of said battery, means including conductor means connecting an opposite side of said switching means to one side of said electrical load, a manually operable control switch connected between an opposite side of said electrical load and an opposite side of said battery, a pulse counter connected to a source of constant frequency clock pulses, said pulse counter coupled to said load control switching means, said pulse counter when reset to a zero count value causing said load control means to be activated to a closed condition to thereby connect said battery and said electrical load, said pulse counter operative to activate said load control means to an open condition to thereby disconnect said battery and electrical load after said pulse counter has counted a predetermined number of clock pulses corresponding to a predetermined time period and reset means coupled to said conductor means for resetting said pulse counter to said zero count value when said manually operable switch is closed at a time when said load control switching means is open.

2. The system according to claim 1 where a resistor is connected between one side of the battery and said conductor means whereby said conductor means develops a high to low voltage transition when said manually operable switch is closed at a time when said load control switching means is open, said reset means responding to said transition.

3. A battery discharge load current control system for a motor vehicle electrical system comprising, a battery, a first electrical load connected to said battery through a first switching means, said first electrical load drawing a relatively small battery discharge current of a first magnitude when connected to the battery, a second electrical load connected to said battery through a second switching means, said second electrical load when connected to said battery drawing a substantially higher battery discharge current when said first magnitude, first and second timer means, means connecting said first timer means to said first switching means including means for causing said first switching means to be activated to an open condition to disconnect the first load from the battery after the elapse of a first predetermined time period, means connecting said second timer means to said second switching means including means for causing said second switching means to be activated to open condition to disconnect the second load from the battery after the elapse of a second predetermined time period, said first time period being substantially longer than said second time period, means for determining the number of miles travelled by the motor vehicle, and means operative when said vehicle has travelled a predetermined number of miles for increasing said first and second time periods.

4. A battery discharge load current control system for a motor vehicle electrical system comprising, a battery, an electrical load connected to said battery through a switching means, timer means, means connecting said timer means to said switching means including means for causing said switching means to be activated to an open condition to disconnect said electrical load from the battery after the elapse of a time period, means for determining the number of miles travelled by the motor vehicle, and means operative when said vehicle has travelled a predetermined number of miles for increasing said timer period.

5. The electrical system according to claim 4 where said electrical load draws a relatively small discharge current when connected to said battery.

* * * * *